United States Patent [19]
Rehmeyer et al.

[11] Patent Number: 5,421,253
[45] Date of Patent: Jun. 6, 1995

[54] CONVECTION OVEN CORN POPPER AND METHOD

[75] Inventors: Theodore H. Rehmeyer, Winston-Salem, N.C.; Donovan J. Fandre, Huntsville, Ala.

[73] Assignee: Tara Products Corporation, Winston-Salem, N.C.

[21] Appl. No.: 210,499

[22] Filed: Mar. 21, 1994

[51] Int. Cl.⁶ .............................................. A23L 1/18
[52] U.S. Cl. .................................................. 99/323.5
[58] Field of Search ................ 99/323.4, 323.5, 323.6, 99/323.7, 323.8, 323.9, 323.11; 220/676; D7/325

[56] References Cited

U.S. PATENT DOCUMENTS

| | | | |
|---|---|---|---|
| 2,922,355 | 1/1960 | Green | 99/323.11 |
| 3,756,139 | 9/1973 | Wolens | 99/323.5 |
| 4,152,974 | 5/1979 | Tienor | 99/323.8 |
| 4,445,427 | 5/1984 | Kiczek | 99/323.5 |
| 4,748,903 | 6/1988 | Fereshetian | D7/325 X |
| 4,763,568 | 8/1988 | Kiczek | D7/325 X |

FOREIGN PATENT DOCUMENTS

| | | | |
|---|---|---|---|
| 1431834 | 2/1966 | France | 220/676 |
| 184689 | 2/1956 | Germany | 220/676 |
| 27763 | 11/1909 | United Kingdom | 220/676 |

*Primary Examiner*—David A. Scherbel
*Assistant Examiner*—Patrick F. Brinson

[57] ABSTRACT

A device is provided to air-pop popcorn in combination with a convection-type oven. The device comprises a spring-mounted bowl to hold corn kernels and includes a slot in the sidewall for popped popcorn to exit therefrom. The exiting popcorn falls into the cooking chamber of the oven where it is held warm until ready to eat.

6 Claims, 2 Drawing Sheets

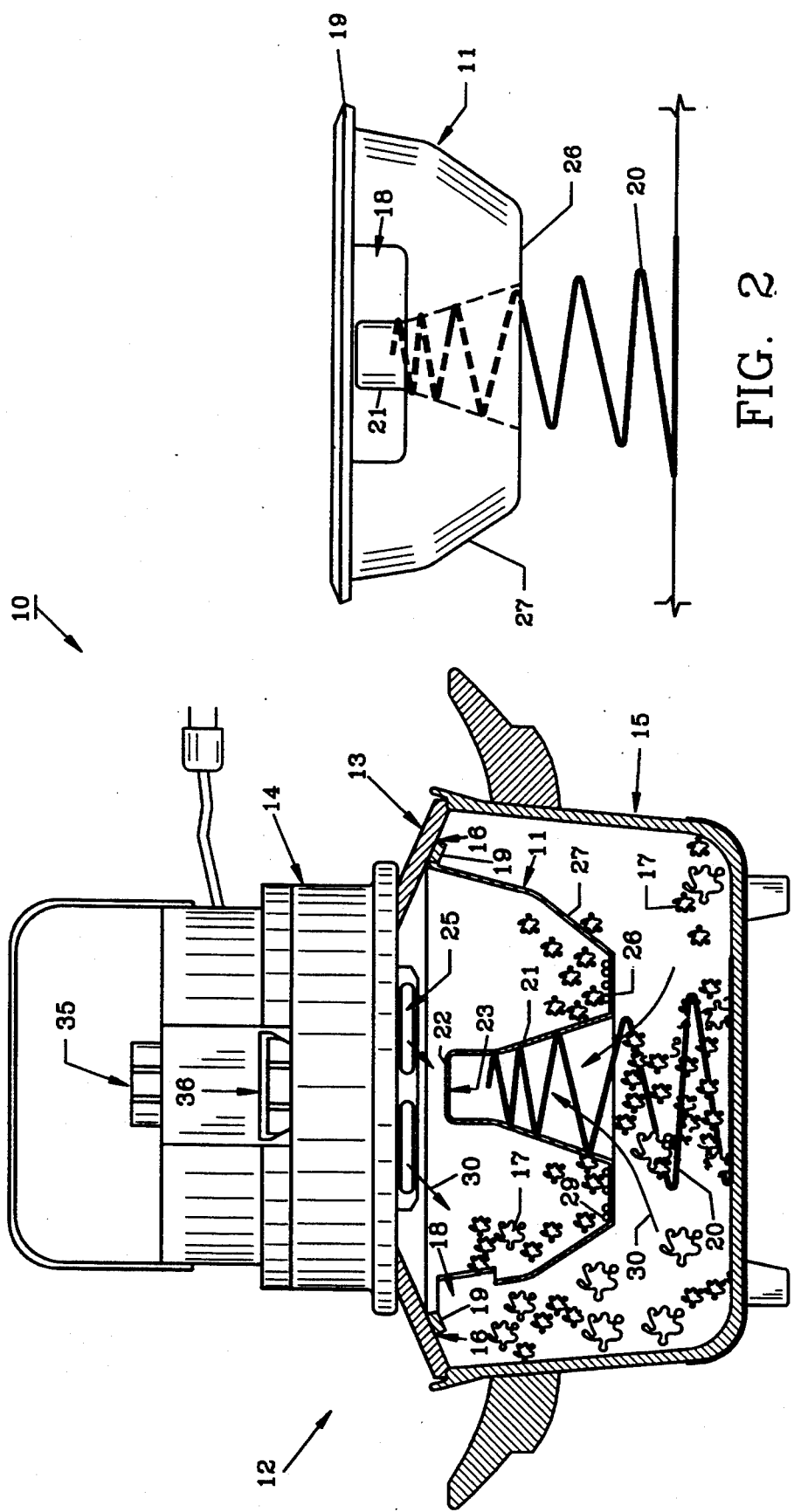

CONVECTION OVEN CORN POPPER AND METHOD

BACKGROUND OF THE INVENTION

1. Field of the Invention

The invention herein pertains to a home-type corn popping device and particularly pertains to a device and method for popping corn in a standard convection-type oven.

2. Description of the Prior Art and Objectives of the Invention

Popcorn has been a part of the American diet since native Americans first served it to pilgrims centuries ago. Although popcorn is considered one of the healthiest snacks a person can eat, popcorn cooked in oil or butter is laden with fat and high in calories. Thus, considering the health-conscious trend of Americans, low-calorie, low-fat snacks such as air-popped popcorn are becoming increasingly popular.

While the technique of popping corn by using hot air has existed for a long time, new devices for cooking with hot air have provided the basis for new developments for hot air popping. Convection-type ovens are relatively new kitchen appliances that cook by blowing hot air from a heating unit such as mounted in a removable lid into a compact, counter-top sized cooking chamber which holds the food therebelow. Even though these convection-type ovens are ideal for cooking meats and vegetables, no effective way existed, using presently available equipment, to efficiently and effectively pop corn in such convection-type ovens. Considering a modern cook's desire for productivity in the kitchen with minimal clutter, it is desirable to prepare as many different foods as possible using the fewest number of appliances.

In addition to contributing to kitchen clutter, ordinary hot-air popcorn poppers dispense popcorn into a container external to the popper. Thus, during the popping process, the popped corn directed into the external container becomes cold and unappealing while the remainder of the corn pops.

Thus, with the problems and disadvantages of prior art popcorn poppers known, the present invention was conceived and one of its objectives is to provide a popcorn popping device for use with a conventional convection-type oven having a special popping bowl contained therein.

It is also an objective to provide a popcorn popping device utilizing only hot air without calorie-laden butter or oil.

It is still another objective to provide a popcorn popping device which eliminates the need for an additional kitchen appliance used solely for corn popping.

It is yet another objective to provide a popcorn popping device which maintains popped corn hot while the unpopped corn is being popped.

Various other advantages and objectives will be realized by those skilled in the art as a more detailed description of the invention is set forth below.

SUMMARY OF THE INVENTION

The aforesaid and other objectives are realized by providing a popcorn popping device which includes a slotted bowl placed inside a convection-type oven and a method for popping corn using the device. An appropriate convection-type oven includes a cooking chamber, a lid which covers the cooking chamber, and a hot-air blower mounted in the lid which directs hot air into the cooking chamber. The slotted bowl holding unpopped corn is positioned below the hot-air blower against the bottom of the lid and spaced from the outer walls of the cooking chamber. Upon heating by the blower, the corn pops and is urged through a slot in the bowl into the oven cooking chamber, where the popped corn stays warm as the remaining corn is popped.

BRIEF DESCRIPTION OF THE DRAWINGS

FIG. 1 shows a cut-away side view of the popcorn popping device which includes a conventional convection oven with a slotted bowl placed inside the cooking chamber;

FIG. 2 illustrates a front view of the popping bowl removed from the oven;

DESCRIPTION OF THE PREFERRED EMBODIMENT

Figure 4:
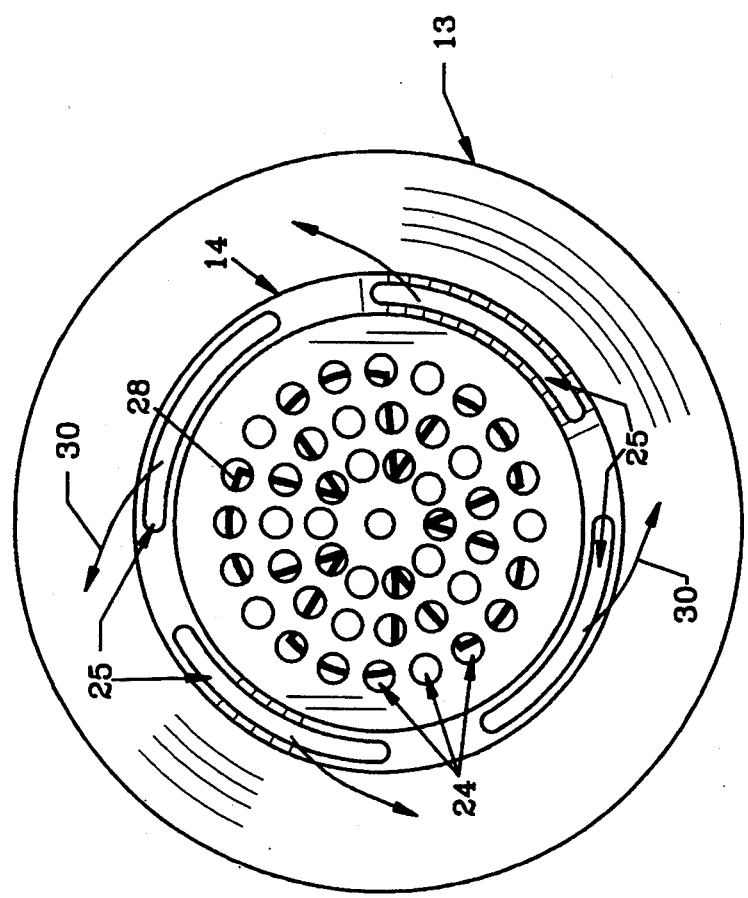
FIG. 4 depicts a view of the convection-type oven lid and hot-air blower shown in FIG. 1 as seen from beneath with the lid removed from the cooking chamber.

The preferred form of the invention is shown in FIG. 1 whereby a popcorn popping device includes a slotted bowl inside a convection-type oven. The oven has a large lower glass cooking chamber to hold food for cooking. The lid of the oven is positioned on top of the cooking chamber and contains a somewhat cylindrically shaped hot-air blower at its center which extends slightly downwardly from the lid. The popping bowl inside the oven, as seen removed therefrom in FIG. 2, is fitted with a coiled spring which urges the bowl upwardly to seal it against the bottom surface of the lid as seen in FIG. 1. The bowl has a central, hollow tower which is open at the top and bottom for air to flow therethrough. For popped corn to escape from the bowl, a slot on the side of the bowl is high enough to prevent the relatively heavy, unpopped corn (kernels) from escaping with the popped corn.

In the preferred method, popcorn kernels are poured into the bowl to form a bottom layer, the bowl having a coiled spring is placed inside the cooking chamber of the oven with the lid placed over the cooking chamber in contact with the upper lip of the bowl, and hot air is directed into the bowl to pop the corn. The popped corn then is blown by the force of the hot air circulating in the bowl, out of the bowl through the slot and into the cooking chamber where it remains until removed.

DETAILED DESCRIPTION OF THE DRAWINGS AND OPERATION OF THE INVENTION

For a better understanding of the invention, turning now to the drawings, FIG. 1 shows popcorn popping device 10 which comprises an aluminum popping bowl 11 inside convection-type oven 12. Bowl 11 is shown in a cut-away side view as is cooking chamber 15 of oven 12. Lid 13, as seen in a partial cut-away side view, sits atop cooking chamber 15 and popping bowl 11. Electrical resistance hot-air blower 14, not shown in cut-away fashion, is in the center of lid 13 so that hot-air outlets 25 on cylindrically shaped blower 14 are inside the outer periphery of bowl 11. Hot-air blower 14 is controlled by timer knob 35 and temperature knob 36 as is conventional on such convection ovens. Below bowl 11, spring 20 urges bowl 11 upwardly so that upper rim 19 of bowl 11 forms a seal (at 16) with the underside surface of lid 13 when lid 13 is positioned on cooking chamber 15. Also shown in FIG. 1, unpopped corn (kernels) 29 rest on base 26 of bowl 11 and popped corn 17 inside bowl 11, exits slot 18, and fills cooking chamber 15 by the motion of the circulating hot air (as depicted by arrows 30) from hot air blower 14 which passes around tower 21.

FIG. 2 illustrates popping bowl 11 as removed from convection-type oven 12. This front view of bowl 11 more clearly demonstrates slot 18, located on the upper section of side wall 27 above base 26 of bowl 11 proximate upper rim 19. Spring 20 extends from below upwardly into central tower 21 to provide stability and to urge bowl 11 into sealing engagement with lid 13 as shown in detail in FIG. 1. Proper, firm contact between rim 19 of bowl 11 and lid 13 is required to insure proper sealing contact and sufficient air flow from blower 14 to heat kernels 29 for popping and to direct popped corn 17 through slot 18 into cooking chamber 15.

Figure 3:
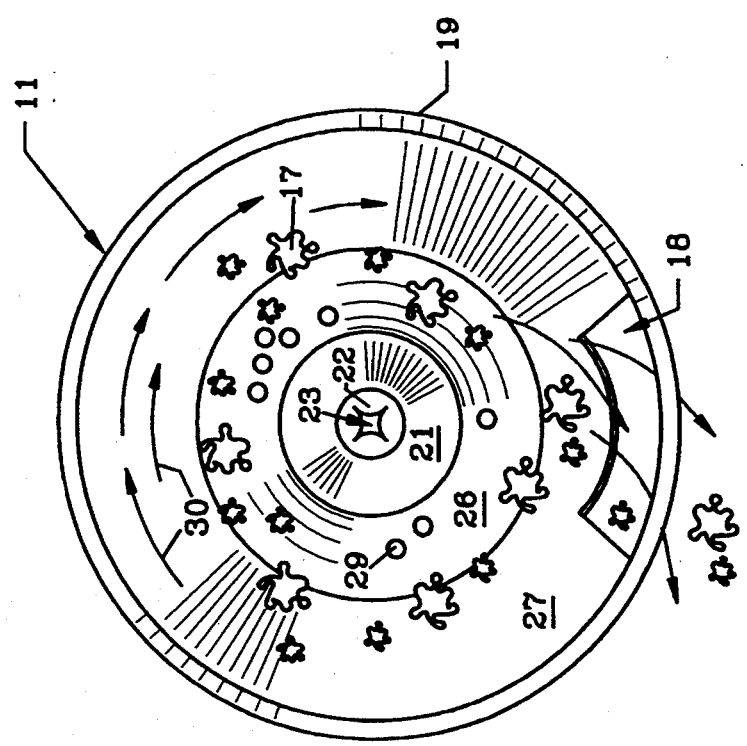
FIG. 3 demonstrates a top view of the popping bowl as seen in FIG. 2.

In FIG. 3 a top view of bowl 11 is seen with popped corn 17 and unpopped kernels 29 inside. This view pictures tower top 22 with aperture 23, tower 21, base 26 and side wall 27 of bowl 11. Slot 18 in side wall 27 of bowl 11 can also be seen from this view as well.

The underside of lid 13 is featured in FIG. 4 with hot-air blower 14 extending through the center of lid 13. The method of the invention utilizes hot air (as illustrated by arrows 30) which exits outlets 25 and re-enters blower 14 after circulating around tower 21 and through return air inlets 24. Hot air 30 is blown by fan blades 28 partially seen inside blower 14 in FIG. 4. The hot air flow is further shown in FIGS. 1 and 3 with hot air 30 seen leaving hot-air outlet 25 and beginning its downward clockwise travel. Hot air 30 blows into bowl 11 in said clockwise direction, heating unpopped kernels 29, and also blows popped corn 17 in the same clockwise direction. Eventually, hot air 30 directs popped corn 17 through slot 18 where it falls into cooking chamber 15. Hot air 30 eventually passes upwardly into hollow tower 21, out tower aperture 23 and into return air inlets 24, which are depicted in FIG. 4, before the air is reheated by electrical resistance elements (not shown) and returned to bowl 11.

While the embodiment of convection-type oven 12 shown and described has hot-air blower 14 with a cover plate having hot-air outlets 25 and return air inlets 24 positioned over fan blades 28, other types of convection-type ovens (not shown) have exposed, uncovered, blower fan blades. Popping bowl 11 may be used in exposed fan blade ovens, as well as oven 12, by merely placing a mesh-type grid (not shown) atop tower 21 of bowl 11 so as to cover the exposed fan blades. The grid will then allow air to enter bowl 11 and popped corn will not inadvertently enter the path of the fan blades. The grid can be sized to extend over the entire open top of bowl 11, but not touching the exposed fan blades. The openings in the grid would be large enough to allow air to pass therethrough but small enough to prevent popcorn from passing through and the grid would also slow the air flow from the fan blades to prevent the unpopped corn from being blown out of bowl 11.

The illustrations and examples provided herein are for explanatory purposes and are not intended to limit the scope of the appended claims.

We claim:

1. A popcorn popping device comprising in combination:
   (a) a bowl for holding unpopped corn, said bowl having an upper rim;
   (b) means to resiliently urge said bowl, and
   (c) a convection-type oven comprising a lid, a hot-air blower, said blower mounted on and extending through said lid, a cooking chamber, said lid for covering said cooking chamber, said cooking chamber for holding popped corn at a warm temperature, said bowl enclosed within said cooking chamber, whereby said resilient urging means urges said bowl upper rim to engage said lid to form a seal therebetween to allow hot air from said blower to circulate inside said bowl to pop the held corn.

2. The combination as defined in claim 1 wherein the outer surface of said bowl defines a side opening, said side opening for releasing popped corn into said cooking chamber.

3. The combination as defined in claim 1 wherein said urging means comprises a spring attached to said bowl.

4. The combination as defined in claim 1 wherein said bowl comprises a tower, said tower centrally positioned inside said bowl.

5. The combination as defined in claim 4 wherein the top of said tower defines an aperture, said aperture for allowing air to pass through said tower.

6. The combination as defined in claim 1 wherein said hot-air blower is cylindrically shaped, said blower comprising a return air inlet, said return air inlet located on the bottom of said blower, and a hot air outlet, said hot air outlet located on the side of said blower.

* * * * *